United States Patent [19]

Farley et al.

[11] Patent Number: 5,186,683
[45] Date of Patent: Feb. 16, 1993

[54] STONE TRAP ASSEMBLY FOR A COMBINE

[75] Inventors: Herbert M. Farley, Plainfield; William L. Cooksey, Romeoville, both of Ill.

[73] Assignee: Case Corporation, Racine, Wis.

[21] Appl. No.: 763,984

[22] Filed: Sep. 23, 1991

[51] Int. Cl.$^5$ .................. A01F 12/10; A01F 12/16
[52] U.S. Cl. .................................................. 460/105
[58] Field of Search ........................... 460/105, 106

[56] References Cited

U.S. PATENT DOCUMENTS

| | | | |
|---|---|---|---|
| 2,209,268 | 7/1940 | Gouinlock et al. | 460/105 X |
| 2,768,627 | 10/1956 | Wolgast | 460/105 |
| 3,209,759 | 10/1965 | Collins et al. | 460/105 |
| 3,576,188 | 4/1971 | Tanis . | |
| 3,643,666 | 2/1972 | Denison . | |
| 3,648,709 | 3/1972 | DeCoene . | |
| 3,779,251 | 12/1973 | Rowland-Hill | 460/106 |
| 3,971,390 | 7/1976 | McDuffie et al. | 56/10.2 X |
| 4,170,235 | 10/1979 | Ashton | 56/14.6 X |
| 4,271,850 | 6/1981 | Ryczek . | |
| 4,343,137 | 8/1982 | Seymour | 460/106 X |
| 4,440,179 | 4/1984 | Bassett et al. | 460/105 |
| 4,657,029 | 4/1987 | Helm . | |

Primary Examiner—George A. Suchfield
Attorney, Agent, or Firm—Dressler, Goldsmith, Shore, Sutker & Milnamow, Ltd.

[57] ABSTRACT

A stone trap assembly for inhibiting stones, rocks, and the like from passing into a combine threshing area from a feeder mechanism adapted to advance crop material through a housing. The stone trap assembly includes a stone receiving trough and a rotatable beater mechanism arranged in combination relative to each other. The stone trough and beater mechanism conjunctively extend laterally across the width of the feeder mechanism. The feeder mechanism includes a series of spiral flight sections, with each flight section having a helix configuration between opposite ends thereof to enhance performance of the feeder mechanism by lessening cyclic contact of the beater mechanism with the crop material passing therethrough and providing a generally uniform flow of crop material to the threshing area of the combine.

12 Claims, 2 Drawing Sheets

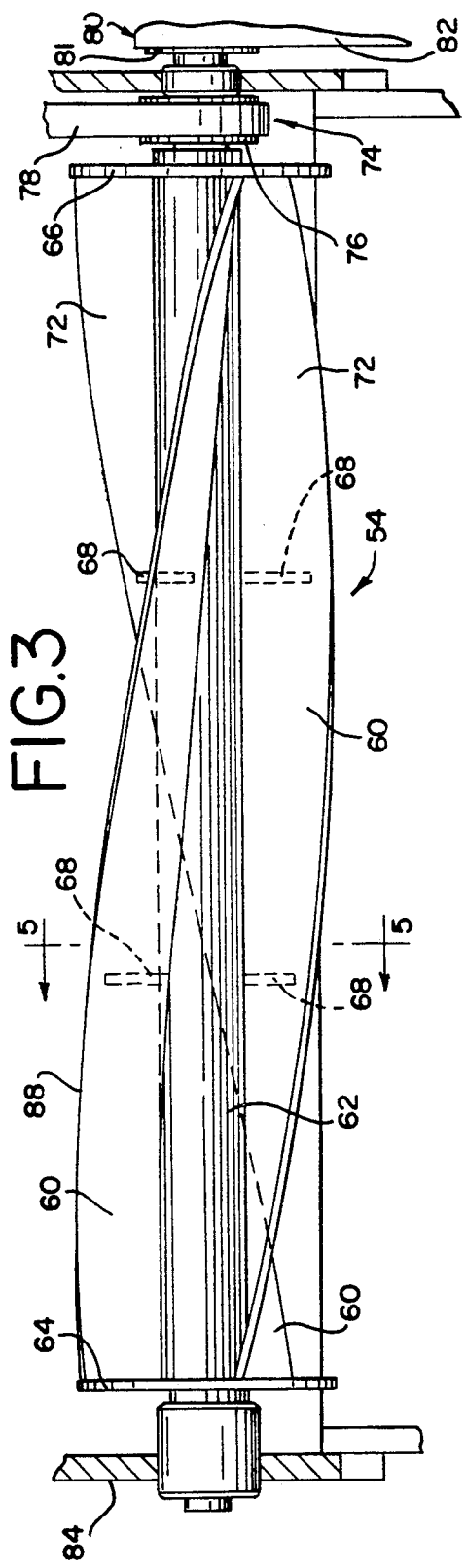
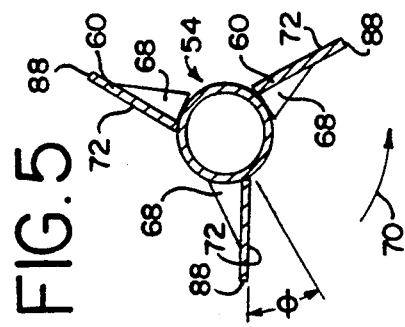
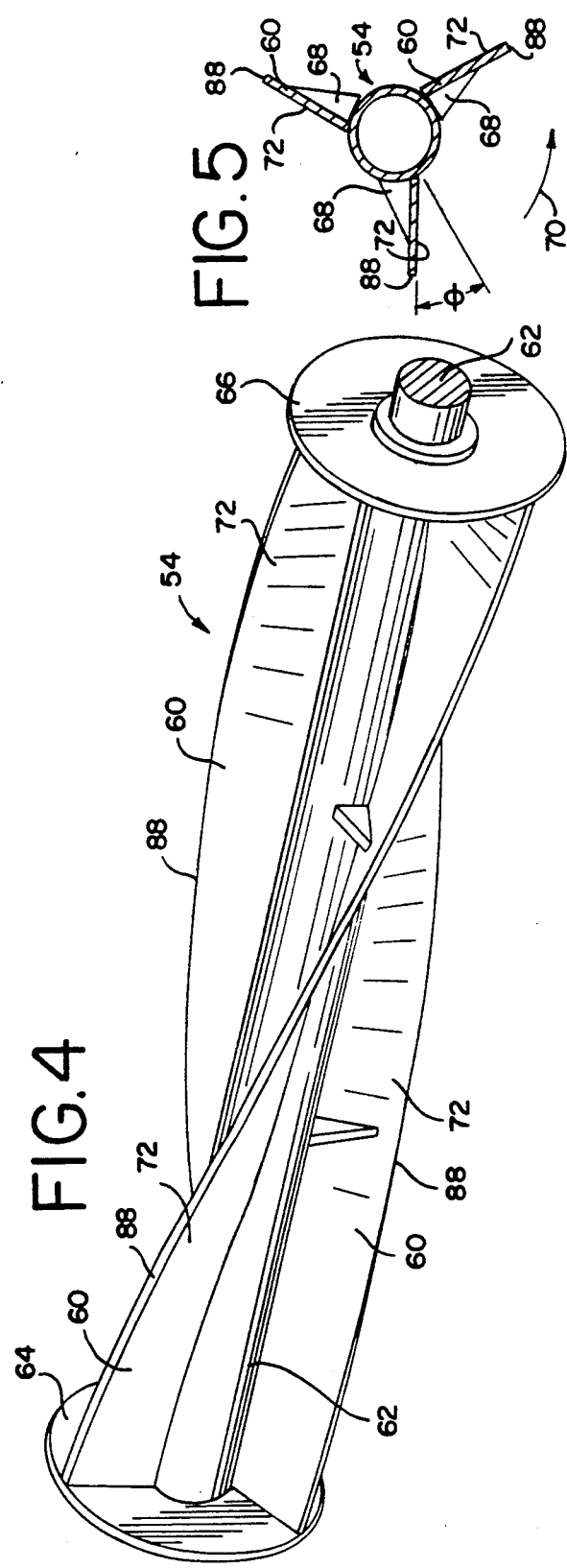

STONE TRAP ASSEMBLY FOR A COMBINE

FIELD OF THE INVENTION

The present invention generally relates to agricultural combines and, more particularly, to a stone trap assembly for inhibiting stones, rocks, and the like that have been fed into the combine from reaching a threshing area of the combine.

BACKGROUND OF THE INVENTION

A conventional agricultural combine includes a header assembly for severing and collecting the crop material as the combine is driven through the field, and a feeder mechanism for rearwardly advancing and elevating the crop material to a threshing area on the combine. The crop material typically advances in a crop mat or layer toward the threshing area. The threshing area of the combine generally includes a relatively large rotatable threshing cylinder arranged in combination with other suitable threshing instrumentalities arranged within a body of the combine.

Agricultural combines operate in different fields of crop material. Some of the fields have stones and rocks lying on or near the surface thereof. As will be appreciated, rocks, stones, and other hard objects can substantially damage and hinder operation of an agricultural combine. The threshing cylinder and cooperative threshing instrumentalities are particularly prone to damage by rocks and stones.

Operator efforts to avoid stones and rocks notwithstanding, the header assembly of the combine will occasionally pick up a rock or stone along with the crop material. Unless the rock is removed before it enters the threshing area, extensive damage to the threshing cylinder, threshing instrumentalities, or both can and often does result.

Various devices have been proposed to protect combines from stones and rocks. Such protective devices are typically arranged between the header assembly and the discharge end of the feeder mechanism. A typical protective device includes a rock holding area in a floor of the feeder mechanism and a rotatable beater for diverting rocks, stones, and the like into the rock holding area. The rock holding area generally constitutes an elongated channel or trough in the floor of the feeder mechanism and extending between opposite sides thereof. Besides diverting stones, rocks and the like toward the rock receiving area, the beater propels the layer of crop material into the threshing area of the combine.

The rotatable beater of such a rock trap typically includes a series of elongated generally straight blades or paddles extending laterally across the width of the beater. As the beater rotates, crop material impacts against a generally planar material engaging face extending along the length of each beater blade. Because of the straight bladed design, the entire elongated outer edge of each beater blade pinches the mat or layer of material passing beneath the beater. This action is very conducive to grain damage, straw damage, and excessive horsepower requirements to rotatably drive the beater. As will be appreciated, the straight bladed design of the heretofore known beaters furthermore creates high cyclic torque loads in the drive mechanism for the rock trap and limits throughput capacity of the feeder mechanism, thus, hindering overall combine performance.

Thus, there is a need and a desire for a stone trap assembly which will inhibit stones, rocks, and the like from passing into a threshing area of a combine without hindering overall combine performance.

SUMMARY OF THE INVENTION

In view of the above, and in accordance with the present invention, there is provided a stone trap assembly for inhibiting rocks, stones, and the like from passing into a combine thresher area from a feeder mechanism adapted to rearwardly advance crop material through a housing. The stone trap assembly includes a stone receiving trough and rotatable beater means arranged in combination relative to each other. The stone trap assembly laterally extends across the feeder mechanism and is arranged between a feeder mechanism inlet and the combine threshing area. Unlike heretofore known beaters for stone trap beaters, the rotatable beater means of the present invention includes a plurality of spiral flight sections, with each flight section having a helix configuration between opposite ends thereof thereby enhancing beater means performance by lessening cyclic contact of the flight sections with the crop material and providing a generally uniform flow of crop material to the threshing area of the combine.

In a preferred form, the beater means of the present invention further includes a laterally elongated support shaft which is mounted for rotation about a fixed axis. Each flight section extends away from and is disposed about the support shaft. The beater means is rotatably driven by suitable power means.

To facilitate combine operation, the feeder mechanism is arranged for vertical movement about a pivot axis provided toward an upper end of the feeder mechanism. In one form of the invention, the stone trap assembly further includes a housing connected to a frame of the combine and has the feeder mechanism housing pivotally connected thereto. The stone trap assembly housing preferably includes the stone receiving trough in depending relation to a bottom wall of the feeder mechanism housing.

In a most preferred form of the invention, three spiral flight sections are provided on the beater means of the stone trap assembly. Each flight section is supported along its length from the elongated support shaft and has opposite ends angularly disposed apart by about 120 degrees. Opposite ends of each flight section are preferably attached to a respective end plate connected to the support shaft.

Each flight section of the beater means includes a material engaging surface which is swept back relative to the direction of beater means rotation to enhance diversion of rocks and the like into the stone receiving trough. The swept back angle of each flight section ranges between about 25 and 40 degrees with a swept back angle of about 30 degrees being preferred. Moreover, each flight section of the beater means is fabricated from a resiliently deformable material to inhibit damage to the stone trap assembly when the respective flight sections impact with rocks, stones, and the like.

Unlike cyclic operations of heretofore known rotatable beaters, because each elongated flight section is provided with a helix configuration, crop material contact with each flight section continually changes along the length thereof during beater means rotation.

The helix configuration of the flight sections promotes the throughput capacity of the stone trap assembly while simultaneously reducing the power required to rotatably drive the beater means thereof. As will be appreciated, the helix configuration of the flight section provides a smooth transition of material flowing past the stone trap assembly as the beater means rotates. Moreover, the helix configuration of each flight section limits contact between an outer edge of each flight section and the crop material passing thereunder, thus inhibiting grain and straw damage to the crop material.

Numerous other features and advantages of the present invention will become readily apparent from the following detailed description, the accompanying drawings, and the appended claims.

BRIEF DESCRIPTION OF THE DRAWINGS

FIG. 3 is an enlarged top plan view of rotatable beater means forming part of the present invention;

FIG. 4 is a perspective view of the beater means forming part of the present invention; and FIG. 5 is a sectional view taken along line 5—5 of FIG. 3.

DESCRIPTION OF THE PRESENT INVENTION

Figure 1:
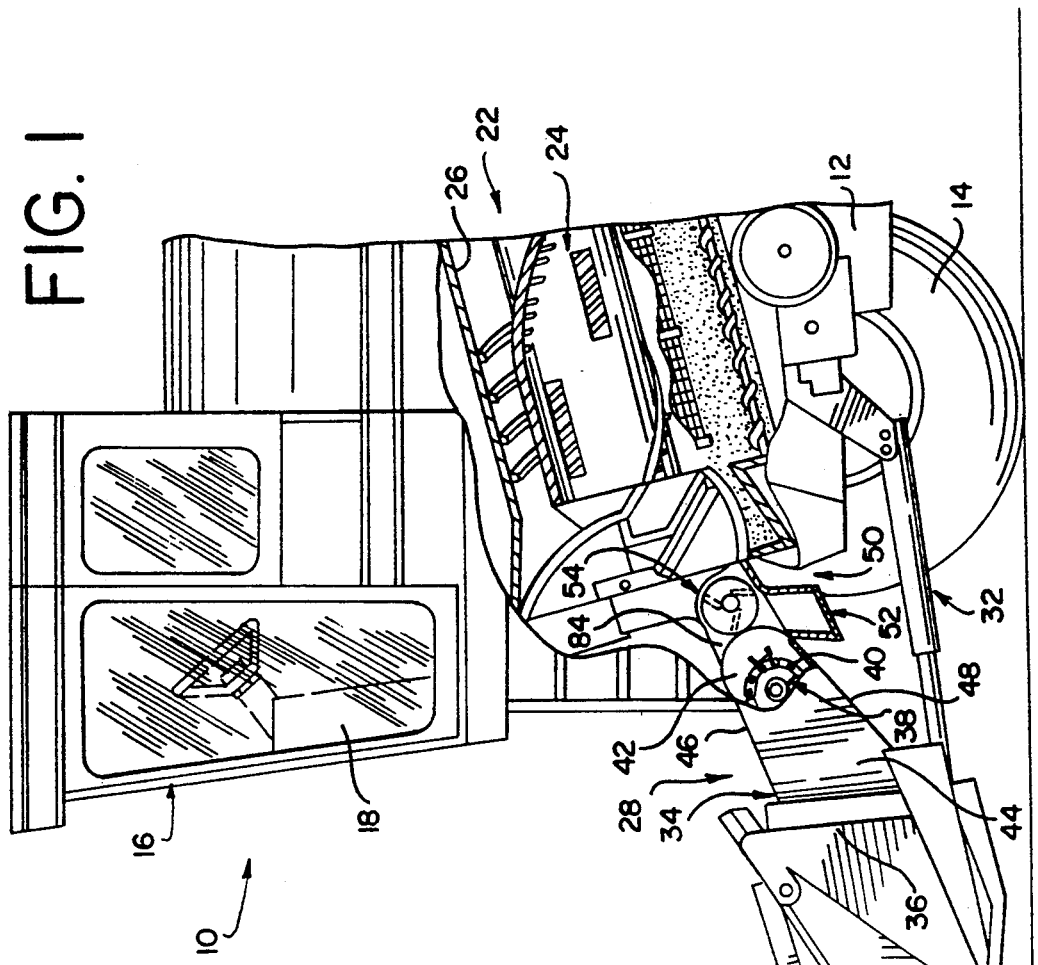
FIG. 1 is a side elevational view with parts broken away and partially shown in section of a forward portion of a combine equipped with a stone trap assembly according to the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings wherein like reference numerals indicate like parts throughout the several views, there is shown a combine 10 with a fore-and-aft extending frame 12 supported by a plurality of wheels 14, only one of which is shown. An operator's station 16 is mounted on a forward portion of the frame 12 above the front wheels 14. The operator's station 16 includes an enclosed cab 18 to protect the operator from heat, cold, dirt, wind, and noise.

Combine 10 further includes a conventional header assembly 20 for severing and gathering crop materials, a threshing area 22 defined by threshing means 24 mounted in a threshing chamber 26 mounted on the elongated frame 12, and a feeder mechanism 28 for rearwardly feeding and elevating crop material to the threshing area 22. In the illustrated form of the invention, the crop threshing means 24 includes an axial flow rotor assembly mounted on the frame 12 for rotation within a threshing cage or cylinder defining the threshing chamber 26. It should be appreciated, however, that the present invention is equally applicable to combines having different types of threshing assemblies.

The feeder mechanism 28 is pivotally connected toward an upper end thereof to the combine frame 12 and is vertically positionable under the influence of an operator controlled driver 32, such as a piston and cylinder assembly, whose operation is controlled from the operator's station 16 of the combine. As shown, feeder mechanism 28 includes a housing 34 having an inlet end 36 adapted to receive crop materials from the header assembly 20 and which combines with conventional crop conveying means 38, such as a chain and slat conveyor, for feeding and introducing crop material to the threshing chamber 26. As is conventional, crop conveying means 38 includes power driven means such as a rotatable drive member 40. The housing 34 of feeder mechanism 28 is preferably a tubular walled structure including laterally spaced side walls 42 and 44, a top wall 46, and a bottom wall 48.

When combine 10 is operated in rocky soil conditions, header assembly 20 will occasionally pick up a rock, stone, or the like, which will be conveyed rearwardly with the crop material toward the threshing area. According to the present invention, a stone trap assembly 50 is arranged between the inlet 36 to the feeder mechanism 28 and the threshing area 22 to inhibit obstacles such as stones, rocks, and the like from passing into the combine threshing area 22. As shown, stone trap assembly 50 generally comprises a stone receiving trough 52 and beater means 54 arranged in cooperative relationship with each other and which conjunctively laterally span the width between opposed side walls 42 and 44 of feeder housing 34. As shown, beater means 54 extends above trough 52 for rotation about a generally fixed axis.

Figure 2:
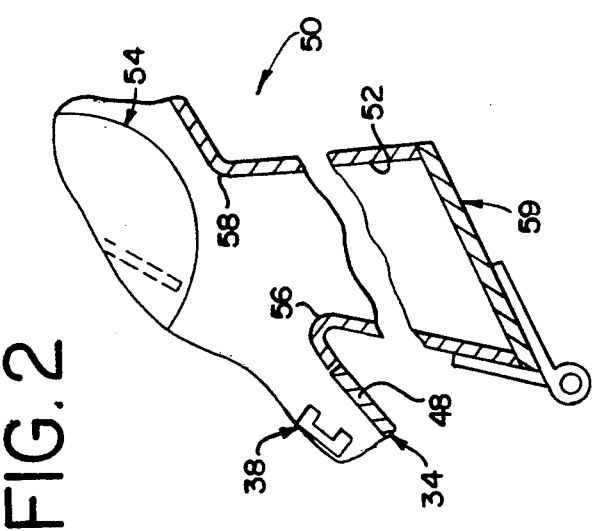
FIG. 2 is an enlarged fragmentary sectional view of a portion of the present invention.

As shown in FIG. 2, the stone receiving trough 52 is preferably configured as an open channel arranged toward a discharge or upper end of and depends from the bottom wall 48 of the feeder mechanism housing 34. The stone receiving trough 52 defines a lateral front edge 56 and a lateral rear edge 58 which are separated in a fore-and-aft direction by a predetermined distance.

As is known in the art, unthreshed material is advanced between the conveyor means 38 and an upper surface of the bottom wall 48 during operation of the combine. The unthreshed material is generally in the form of a cohesive sheet that has sufficient momentum to cause it to bridge the distance separating the front and rear edges 56 and 58, respectively, of trough 52. In addition to facilitating movement of the crop layer or mat toward the threshing area 22, if the unthreshed material contains any foreign obstacles having a high mass, such as stones, rocks, pieces of metal, etc., the beater means 54 engages such foreign obstacles and forcibly drives them through the gap separating edges 56 and 58 and into the trough 52 thereby inhibiting their introduction into the threshing area of the combine. To facilitate combine operation, the stone trap assembly may further include a releasable door 59 provided at the bottom of the stone receiving trough 52 for intermittently emptying the trough 52.

Turning to FIG. 3, beater means 54 includes a series of equally spaced spiral flight sections 60. As shown, each flight section has a helix configuration between opposite ends thereof. Preferably, beater means 54 is comprised of three equally spaced flight sections with opposite ends of each flight section being angularly disposed apart by about 120°. Moreover, each flight section 60 is preferably fabricated from a steel or suitable steel alloy. It should be appreciated, however, that the flight sections 60 may be fabricated from a resiliently deformable material, i.e., high impact plastic or the like, to inhibit damage to and reduce operational noise generated from the stone trap assembly 50 upon engagement of the beater means 54 with rock, stones, or the like.

In a preferred form of the invention, beater means 54 includes a laterally elongated shaft-like support 62 which axially extends beyond opposite ends of the flight sections 60. As shown, each flight section 60 extends away from and is disposed about the support 62. As illustrated in FIGS. 3 and 4, at least two end plates 64 and 66 are connected to the support 62 and to opposite ends of each flight section 60 to add strength and rigidity to the beater means 54.

In a preferred form, each flight section is supported along its length by suitable gussets 68 which further add strength and rigidity to the beater means 54. As illustrated in FIG. 5, beater means 54 is adapted to be rotatably driven in a counter-clockwise direction as generally indicated by arrow 70. To facilitate the diversion of rocks and the like down into stone receiving trough 52, each flight section of beater means 54 defines a laterally elongated material engaging surface 72 which, in addition to its skewed longitudinal configuration, is swept back through an angle Θ relative to the direction of rotation of the beater means 54. The swept back angle Θ of the material engaging surface 72 may range between about 25 degrees and about 40 degrees and is preferably maintained at about 30 degrees relative to the direction of rotation of the beater means.

As shown in FIG. 3, the stone trap assembly 50 further includes drive means 74 for rotatably operating the beater means 54. The drive means 74 preferably includes a member 76 fixedly connected for rotation with support shaft 62. As shown, member 76 is driven through suitable force transfer means 78 from a suitable power source (not shown) on the combine. In the illustrated embodiment, conveyor 38 of the feeder mechanism 28 (FIG. 1) is driven through drive means 80 including a member 81 mounted on shaft 62 and suitable force transfer means 82. It should be appreciated, however, that the stone trap assembly of the present invention can be driven independently of or conjointly with the feeder mechanism 28 without detracting from the spirit and scope of the present invention.

As schematically illustrated in FIGS. 1 and 3, the stone trap assembly of the present invention further includes a housing 84 which is connected to the combine frame 12 and defines the stone receiving trough 52. In one form of the invention, housing 34 of the feeder mechanism 28 is articulately joined or pivotally connected to housing 84 of the stone trap assembly. Alternatively, and with slight redesign efforts, housings 34 and 84 could be designed as a unitary housing facilitating pivotal movement of the feeder mechanism 28 about the beater means support shaft 62.

During combine operation, rotary power is provided to member 76 of the drive mechanism 74 through the force transfer means 78 thereby rotating beater means 54 of the stone trap assembly. The rotary action of the beater means 54 facilitates crop material advancement toward the threshing area of the combine.

The longitudinally skewed configuration between opposite ends of each flight section 60 enhances the performance of the beater means 54 by lessening cyclic contact of the flight sections with the crop material and provides a generally uniform flow of crop material to the threshing area of the combine. That is, because of the configuration of each flight section, crop material engagement and contact with the elongated material engaging surface 72 of each flight section 60 continually changes as the beater means 54 rotates. Thus, the beater means 54 provides both a rock catching function and enhances the throughput capacity of the stone trap assembly 50. Moreover, the swept back configuration of each flight section 60 facilitates diversion of stones, rocks, and etc. down into the stone receiving trough 52.

The helix configuration of each flight section furthermore promotes point contact between an outer edge 88 of each flight section and the crop materials advancing beneath the beater means 54. The point contact between the flight sections and the crop material mat or layer reduces the power required to drive the beater means, substantially eliminates cyclic loads from being placed on the drive mechanism 74, and treats the crop material more gently than heretofore known, thus reducing grain and straw damage.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A stone trap assembly for a combine having a mobile frame, crop threshing means mounted on the frame, crop feeding means comprising a housing attached toward an upper end to the frame, and power means for driving said crop feeding means and advancing crop material toward said crop threshing means, said crop feeding means housing including lateral spaced side walls, a top wall and a bottom wall, said stone trap assembly comprising:

a stone receiving trough arranged between an inlet to said crop feeding means and said crop threshing means for receiving stones and the like being advanced with the crop materials toward said threshing means, with said stone receiving trough extending across the width of said crop feeding means; and rotatable beater means laterally mounted about a generally fixed axis above said stone receiving trough for diverting rocks and the like down into said stone receiving trough, said beater means including a series of equally spaced laterally elongated spiral flight sections for engaging and propelling crop material toward said crop threshing means, with each flight section having a helix configuration between opposite ends thereof such that crop material contact shifts along the length of each flight section as the beater means rotates.

2. The stone trap assembly according to claim 1 wherein said beater means further includes a laterally elongated shaft, with each flight section extending away from said elongated shaft and disposed thereabout.

3. The stone trap assembly according to claim 1 wherein said beater means includes at least three flight sections, each flight section being supported along its length from said shaft and with opposite ends of each flight section being angularly disposed apart by about 120°.

4. The stone trap assembly according to claim 1 wherein each flight section of said beater means includes a material engaging surface which is swept back relative to the direction of beater means rotations to enhance diversion of stones and the like into said stone receiving trough.

5. The stone trap assembly according to claim 4 wherein each flight section has a swept back angle ranging between about 25° and about 40° relative to the direction of beater means rotation.

6. A stone trap assembly for a combine having a mobile frame, threshing means including a threshing chamber mounted on said frame for processing crop materials, crop feeding means with a crop material inlet mounted toward a forward end of said frame for introducing crop material to the threshing chamber, said stone trap comprising:

a stone receiving trough depending from and extending across said crop feeding means, said trough being arranged downstream of said crop material inlet and upstream of said threshing chamber; and rotatably driven beater means laterally extending across said crop feeding means and arranged in combination with said stone receiving trough for inhibiting stones and like objects from passing into said threshing chamber, said beater means including a series of spiral flight sections, each flight section having a laterally elongated and skewed configuration between opposite ends thereof thereby enhancing beater means performance by lessening cyclic contact of the flight sections with the crop material while providing a generally uniform flow of crop material to the threshing chamber.

7. The stone trap assembly according to claim 6 wherein said beater means comprises an elongated shaft which supports the beater means for rotation, and at least two end plates which are interconnected to said elongated shaft and to each flight section to provide strength and rigidity to the beater means.

8. The stone trap assembly according to claim 7 wherein opposite ends of each flight section are attached to the respective end plates at locations spaced approximately 120° apart from each other.

9. The stone trap assembly according to claim 6 wherein each flight section of said beater means is fabricated from a resiliently deformable material to inhibit damage to the stone trap assembly upon engagement with a rock or the like.

10. The stone trap assembly according to claim 6 wherein each flight section is swept back at an angle of about 30° relative to the direction of rotation of the beater to divert rocks and the like into said stone receiving trough.

11. A stone trap assembly for a combine including a frame, a threshing assembly supported by the frame, crop conveyor means mounted toward a forward end of the combine for moving crop material rearwardly and upwardly toward the threshing assembly, said crop conveyor means including a housing pivotally connected to the frame, with a crop inlet at a lower end of the housing and a crop outlet toward an upper end of the housing, said crop conveyor means housing having laterally spaced side walls, a top wall and a bottom wall, said stone trap assembly comprising:

an open channel arranged toward an upper end of said crop conveyor means housing to receive stones, rocks and the like from the crop material moving toward the threshing area, said channel extending between opposite sides of said crop conveyor means and includes a lateral front edge and a lateral rear edge; and a rotatably driven beater assembly positioned relative to the front and rear edges of and for diverting stones and the like into said channel thereby inhibiting their passage into and damaging said threshing assembly, said beater assembly including a beater having a laterally elongated axis of rotation and means for driving said beater in timed relation to said crop conveyor means, with said beater having a plurality of spiral flight sections equally spaced about said axis of rotation, each spiral flight section having a laterally elongated material engaging surface with a helix configuration to minimize cyclic loading of the driving means while enhancing throughput capacity of the stone trap assembly.

12. The stone trap assembly according to claim 11 further including a housing connected to said combine frame and defining said open channel, with said crop conveyor means housing being pivotally connected thereto for vertical movement to facilitate combine operation.

* * * * *